(12) United States Patent
Xu

(10) Patent No.: US 10,451,929 B2
(45) Date of Patent: Oct. 22, 2019

(54) ARRAY SUBSTRATE, MANUFACTURING METHOD THEREOF, LIQUID CRYSTAL DISPLAY PANEL AND LIQUID CRYSTAL DISPLAY DEVICE

(71) Applicant: Shenzhen China Star Optoelectronics Technology Co. Ltd., Shenzhen, Guangdong (CN)

(72) Inventor: Xiangyang Xu, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 193 days.

(21) Appl. No.: 15/536,791

(22) PCT Filed: Apr. 21, 2017

(86) PCT No.: PCT/CN2017/081531
§ 371 (c)(1),
(2) Date: Jun. 16, 2017

(87) PCT Pub. No.: WO2018/170995
PCT Pub. Date: Sep. 27, 2018

(65) Prior Publication Data
US 2019/0094631 A1 Mar. 28, 2019

(30) Foreign Application Priority Data

Mar. 20, 2017 (CN) .......................... 2017 1 0171629

(51) Int. Cl.
*G02F 1/1343* (2006.01)
*G02F 1/1335* (2006.01)
*G02F 1/1362* (2006.01)

(52) U.S. Cl.
CPC .. *G02F 1/134309* (2013.01); *G02F 1/133555* (2013.01); *G02F 1/136209* (2013.01);
(Continued)

(58) Field of Classification Search
CPC .................................................. G02F 1/134309
See application file for complete search history.

(56) References Cited

U.S. PATENT DOCUMENTS

| 2008/0049176 A1* | 2/2008 | Kim .................. G02F 1/133555 349/114 |
| 2010/0141879 A1* | 6/2010 | Lee .................. G02F 1/133555 349/114 |
| 2016/0266450 A1* | 9/2016 | Kim .................. G02F 1/133514 |

FOREIGN PATENT DOCUMENTS

| CN | 102176095 A | 9/2011 |
| CN | 103901686 A | 7/2014 |

(Continued)

*Primary Examiner* — Edmond C Lau
(74) *Attorney, Agent, or Firm* — Andrew C. Cheng

(57) ABSTRACT

The present invention provides an array substrate, comprising a substrate, a gate, a gate insulation layer, an active layer, a source, a drain, a data line, an organic insulation layer, a pixel electrode and a common electrode, and the pixel electrode is provided with an opening at a position corresponding to the data line, and the data line has a reflective function and forms a reflective region for reflecting light passing through the opening of the common electrode layer. The present invention further provides a manufacturing method thereof, a liquid crystal display panel and a liquid crystal display device.

9 Claims, 1 Drawing Sheet

(52) U.S. Cl.
CPC .............. *G02F 1/136286* (2013.01); *G02F 2001/134372* (2013.01); *G02F 2001/136222* (2013.01)

(56) References Cited

FOREIGN PATENT DOCUMENTS

| | | |
|---|---|---|
| CN | 104280932 A | 1/2015 |
| CN | 206020892 U | 3/2017 |
| JP | 2011227116 A | 11/2011 |

* cited by examiner

ARRAY SUBSTRATE, MANUFACTURING METHOD THEREOF, LIQUID CRYSTAL DISPLAY PANEL AND LIQUID CRYSTAL DISPLAY DEVICE

CROSS REFERENCE

This application claims the priority of Chinese Patent Application No. 201710171629.6, entitled "Array substrate, manufacturing method thereof, liquid crystal display panel and liquid crystal display device", filed on Mar. 20, 2017, the disclosure of which is incorporated herein by reference in its entirety.

FIELD OF THE INVENTION

The present invention relates to a touch panel technology field, and more particularly to an array substrate, a manufacturing method thereof, a liquid crystal display panel and a liquid crystal display device.

BACKGROUND OF THE INVENTION

The Trans-flective Liquid Crystal Display has both transmissive and reflective characteristics, and the transflective liquid crystal panel comprises a transparent region of the transparent electrode and a reflective region of the reflective layer in a pixel domain. In the dark place, the transmission region of the pixel area and the backlight can be used to display the images, and in the bright place, the reflection region of the pixel domain and the external light is used to display the images. Therefore, the transflective liquid crystal display device is widely used for being adaptable to various bright and dark environments.

SUMMARY OF THE INVENTION

The present invention provides a transflective array substrate and a liquid crystal display panel adaptable to various bright and dark environments.

The present invention further provides a manufacturing method thereof and a liquid crystal display device.

The array substrate provided by the present invention comprises a substrate, a gate, a gate insulation layer, an active layer, a source, a drain, a data line, an organic insulation layer, a pixel electrode and a common electrode, and the pixel electrode is provided with an opening at a position corresponding to the data line, and the data line has a reflective function and forms a reflective region for reflecting light passing through the opening of the common electrode layer.

A width of the opening is smaller than a width of the data line. Namely, a front projection of the data line one the organic insulation layer is partially overlapped with the pixel electrodes on both sides of the opening to avoid the occurrence of light leakage affect the pixels.

A layer where the pixel electrode is located and a layer where the common electrode is located are stacked and are spaced by an insulation layer, and a width of a front projection of the opening on the corresponding common electrode is smaller than a width of the common electrode so that light passes and light leakage can be prevented.

A width of the common electrode corresponding to the opening is the same as the width of the data line corresponding to the opening.

The array substrate comprises a transmissive region, which is disposed and spaced from the reflective region.

The opening and the pixel electrode are formed in the same step.

The common electrode is a structure having a slit, and two sides of the common electrode corresponding to the opening have slits.

The present application provides a liquid crystal display panel, comprising a color filter substrate, an array substrate and a liquid crystal layer sandwiched between the color filter substrate and the array substrate, and a black matrix being not provided at a position corresponding to an opening on the color filter substrate.

The manufacturing method of the array substrate provided by the present application comprises forming a pixel electrode, an insulation layer and a common electrode on the organic insulation layer of the substrate in order, wherein the pixel electrode comprises an opening corresponding to a data line under the organic insulation layer on the substrate, and two sides of the common electrode corresponding to the opening are slits.

The present application provides a liquid crystal display device, comprising the liquid crystal display panel and a backlight module.

The liquid crystal display panel of the present application can use the transmission region of the pixel area and the backlight to display the images in the dark place, and uses the reflection region of the pixel domain and the external light to display the images in the bright place for realizing the transflective liquid crystal display.

BRIEF DESCRIPTION OF THE DRAWINGS

The structural features and effects of the present invention will be more clearly described, which will now be described in detail with reference to the accompanying drawings and specific embodiments.

DETAILED DESCRIPTION OF PREFERRED EMBODIMENTS

For better explaining the technical solution and the effect of the present invention, the present invention will be further described in detail with the accompanying drawings in the specific embodiments. The figures are for illustrative purposes only and are illustrative only but not to be construed as limiting the present application.

Figure 1:
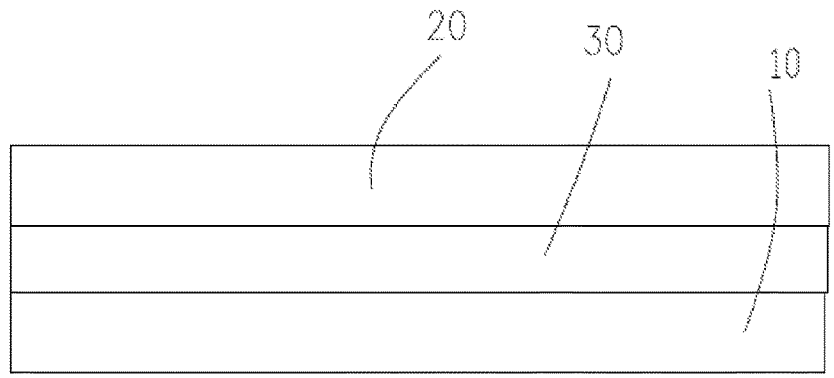
FIG. 1 is a diagram of a liquid crystal display panel of the present invention.

Please refer to FIG. 1. The present invention provides an array substrate 10 and a liquid crystal display panel, wherein the liquid crystal display panel comprises a color film substrate 20, the array substrate 10 and a liquid crystal layer 30 between the color film substrate 20 and the array substrate 10. The array substrate 10 in FIG. 1 is a schematic diagram, and the specific structure is shown in FIG. 2.

Figure 2:
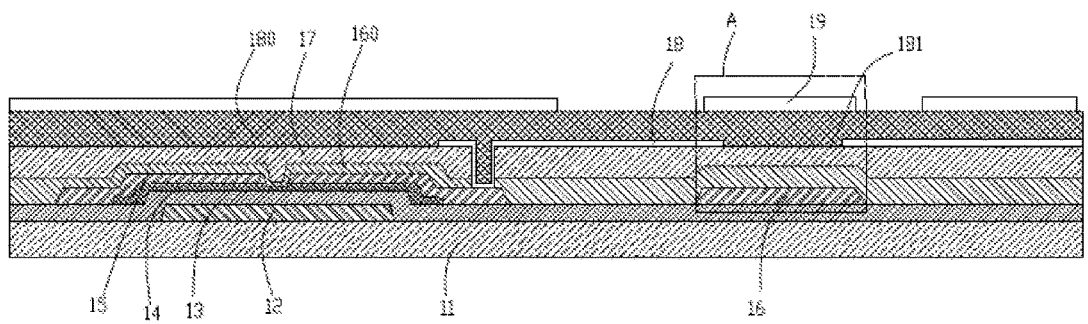
FIG. 2 is a sectional view diagram of the array substrate shown in FIG. 1.

As shown in FIG. 2, the array substrate 10 comprises a substrate 11, a gate 12, a gate insulation layer 13, an active layer 14, a source and a drain 15, a data line 16, an organic insulation layer 17, a pixel electrode 18 and a common electrode 19. The data line 16 has a reflective function and forms a reflective region A for reflecting light passing through the pixel electrode 18 of the common electrode layer 19.

The substrate 11 is a glass plate. The gate 12 is formed on the surface of the substrate 11. The gate insulation layer 13 covers the surface of the substrate 11 and the gate electrode 12. The active layer 14 is formed on the gate insulation layer 13, and the source and the drain are formed on the active layer 14 and are disposed and spaced, and the source and the drain 15 form a channel with the active layer 14. The data line 16 is formed at the same time with the active layer 14 and the source and the drain 15 and is located in the same layer. The active layer 14, the source and the drain 15, and the data line 16 are covered with a first insulation layer 160. The organic insulation layer 17 is stacked on the first insulation layer 160. The pixel electrode 18, the insulation layer 180, and the common electrode 19 are stacked on the organic insulation layer 17 in order. The pixel electrode 18 is connected to the source or the drain via a through hole through the first insulation layer 160 and the organic insulation layer 17.

Furthermore, the pixel electrode 18 is provided with an opening 181 at a position corresponding to the data line 16, and a width of the opening 181 is smaller than a width of the data line 16. Namely, a front projection of the data line 16 one the organic insulation layer 17 is partially overlapped with the pixel electrodes 18 on both sides of the opening to avoid the occurrence of light leakage affect the pixels.

A layer where the pixel electrode 18 is located and a layer where the common electrode 19 is located are stacked and are spaced by the insulation layer 180, and a width of a front projection of the opening 181 on the corresponding common electrode 191 is smaller than a width of the common electrode 19 so that light enters the reflecting surface of the data line 16 through the opening 181. In this embodiment, the reflection region A is a portion of the reflection surface of the data line 16 to the common electrode 19.

Furthermore, a width of the common electrode 19 corresponding to the opening 181 is the same as the width of the data line 16 corresponding to the opening 181.

The array substrate 10 comprises a transmissive region (not shown), which is disposed and spaced from the reflective region A. The opening 181 and the pixel electrode 18 are formed in the same step.

The common electrode 19 is a structure having a slit, and two sides of the common electrode 19 corresponding to each of the openings 18 are slits so that light enters the reflective region.

Figure 3:
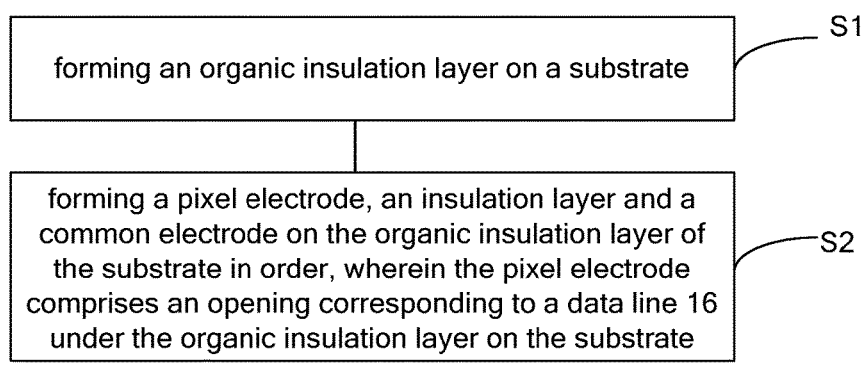
FIG. 3 is a flowchart of a manufacturing method of the array substrate according to the present invention.

Please refer to FIG. 3. The present application further provides a manufacturing method of the array substrate. The method comprises step S1, forming an organic insulation layer 17 on a substrate 11.

Step S2, forming a pixel electrode 18, an insulation layer 180 and a common electrode 19 on the organic insulation layer 17 of the substrate 11 in order, wherein the pixel electrode 18 comprises an opening 181 corresponding to a data line 16 under the organic insulation layer 17 on the substrate 11, and two sides of the common electrode 19 corresponding to the opening 181 are slits.

Specifically, step S1 comprises forming a first metal layer on the substrate 11, and patterning the first metal layer to form the gate 12.

The gate insulation layer 13 is deposited on the surface of the gate electrode 12 and the substrate 11. A material of the gate insulation layer 13 is selected from one of a silicon oxide layer, a silicon nitride layer, a silicon oxynitride layer and a combination thereof.

A semiconductor layer and a second metal layer are formed on the gate insulation layer 13 in order, and the semiconductor layer and the second metal layer are patterned to respectively form the active layer 14, the source and the drain 15 and the data line 16 which has a reflection function and is disposed and spaced from the source and the drain. A material of the second metal layer is selected from one of copper, tungsten, chromium, aluminum and a combination thereof. The semiconductor layer is used to form a channel that turns on or off between the source and the drain.

The patterning process comprises patterning and film forming processes of implementing exposure, development, metal wet etching, etching, photoresistor burning and stripping with the gray scale mask to form the gate 12, the active layer 14, the source and the drain 15 and the data line 16 shown in FIG. 1. The method similarly comprises forming the organic insulating layer 17, the gate insulation layer 13, the insulation layer 180, the pixel electrode 18, and the common electrode 19 by depositing a base layer and implementing exposure, development and etching with a mask.

The black matrix is not provided at a position corresponding to the opening 18 on the color filter substrate 20 of the liquid crystal display panel according to the present application so that light enters, and the processes can be simplified and the thickness of the color filter substrate can be decreased. The liquid crystal display panel of the present application can use the transmission region of the pixel area and the backlight to display the images in the dark place, and uses the reflection region of the pixel domain and the external light to display the images in the bright place for realizing the transflective liquid crystal display.

The present application further provides a liquid crystal display device, comprising the liquid crystal display panel and a backlight module. The liquid crystal display panel is stacked on the backlight module to provide a light source by the backlight module.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. An array substrate, comprising a substrate, a gate, a gate insulation layer, an active layer, a source, a drain, a data line, an organic insulation layer, a pixel electrode and a common electrode, wherein the pixel electrode is provided with an opening at a position corresponding to the data line, and the data line has a reflective function and forms a reflective region for reflecting light passing through the opening and the common electrode layer;

wherein a width of the opening is smaller than a width of the data line;

wherein a layer where the pixel electrode is located and a layer where the common electrode is located are stacked and are spaced by the organic insulation layer, and a width of a projection of the opening on the common electrode is smaller than a width of the common electrode; and wherein the width of the common electrode corresponding to the opening is the same as the width of the data line corresponding to the opening such that the common electrode and the data line are respectively located on two opposite sides of the pixel electrode and have the same width that is larger than the width of the opening to shield the opening on the two opposite sides.

2. The array substrate according to claim 1, wherein the array substrate comprises a transmissive region, which is disposed and spaced from the reflective region.

3. The array substrate according to claim 1, wherein the opening and the pixel electrode are formed in the same step.

4. The array substrate according to claim 1, wherein the common electrode is a structure having a slit, and two sides of the common electrode corresponding to the opening have slits.

5. A liquid crystal display panel, comprising a color filter substrate, an array substrate and a liquid crystal layer sandwiched between the color filter substrate and the array substrate, and a black matrix being not provided at a position corresponding to an opening on the color filter substrate, and the array substrate comprising a substrate, a gate, a gate insulation layer, an active layer, a source, a drain, a data line, an organic insulation layer, a pixel electrode and a common electrode, wherein the pixel electrode is provided with an opening at a position corresponding to the data line, and the data line has a reflective function and forms a reflective region for reflecting light passing through the opening and the common electrode layer;
 wherein a width of the opening is smaller than a width of the data line;
 wherein a layer where the pixel electrode is located and a layer where the common electrode is located are stacked and are spaced by the organic insulation layer, and a width of a projection of the opening on the common electrode is smaller than a width of the common electrode; and
 wherein the width of the common electrode corresponding to the opening is the same as the width of the data line corresponding to the opening such that the common electrode and the data line are respectively located on two opposite sides of the pixel electrode and have the same width that is larger than the width of the opening to shield the opening on the two opposite sides.

6. The liquid crystal display panel according to claim 5, wherein the array substrate comprises a transmissive region, which is disposed and spaced from the reflective region.

7. The liquid crystal display panel according to claim 5, wherein the opening and the pixel electrode are formed in the same step.

8. The liquid crystal display panel according to claim 5, wherein the common electrode is a structure having a slit, and two sides of the common electrode corresponding to the opening have slits.

9. A manufacturing method of an array substrate, wherein the method comprises forming an organic insulation layer on a substrate;
 forming a pixel electrode, an insulation layer and a common electrode on the organic insulation layer of the substrate in order, wherein the pixel electrode comprises an opening corresponding to a data line under the organic insulation layer on the substrate, and two sides of the common electrode corresponding to the opening are slits;
 wherein a width of the opening is smaller than a width of the data line;
 wherein a layer where the pixel electrode is located and a layer where the common electrode is located are stacked and are spaced by the organic insulation layer, and a width of a projection of the opening on the common electrode is smaller than a width of the common electrode; and
 wherein the width of the common electrode corresponding to the opening is the same as the width of the data line corresponding to the opening such that the common electrode and the data line are respectively located on two opposite sides of the pixel electrode and have the same width that is larger than the width of the opening to shield the opening on the two opposite sides.

\* \* \* \* \*